US012273971B2

(12) United States Patent
Pirozzi et al.

(10) Patent No.: US 12,273,971 B2
(45) Date of Patent: Apr. 8, 2025

(54) STAGE LIGHT FIXTURE, STAGE LIGHT SYSTEM AND METHOD FOR OPERATING A STAGE LIGHT FIXTURE

(71) Applicant: CLAY PAKY S.R.L., Seriate (IT)

(72) Inventors: Carmine Pirozzi, Seriate (IT); Giorgio Masserdotti, Seriate (IT)

(73) Assignee: CLAY PAKY S.R.L., Seriate (IT)

( * ) Notice: Subject to any disclaimer, the term of this patent is extended or adjusted under 35 U.S.C. 154(b) by 125 days.

(21) Appl. No.: 18/207,895

(22) Filed: Jun. 9, 2023

(65) Prior Publication Data

US 2023/0413399 A1 Dec. 21, 2023

(30) Foreign Application Priority Data

Jun. 16, 2022 (IT) ........................ 102022000012806

(51) Int. Cl.
*H05B 45/10* (2020.01)
*H05B 47/175* (2020.01)

(52) U.S. Cl.
CPC ........... *H05B 45/10* (2020.01); *H05B 47/175* (2020.01)

(58) Field of Classification Search
CPC .... H05B 45/10; H05B 47/175; H05B 47/155; H05B 47/165; G09G 3/22
See application file for complete search history.

(56) References Cited

U.S. PATENT DOCUMENTS

| | | | |
|---|---|---|---|
| 7,139,617 B1 * | 11/2006 | Morgan | H05B 47/155 362/85 |
| 2008/0140231 A1 | 6/2008 | Blackwell et al. | |
| 2015/0148134 A1 * | 5/2015 | Brunell | G07F 17/34 463/31 |
| 2018/0225913 A9 * | 8/2018 | Gronkowski | G07F 17/3269 |

FOREIGN PATENT DOCUMENTS

EP 0752632 8/2001

OTHER PUBLICATIONS

Italian Search Report and Written Opinion in IT Application No. 202200012806, mailed Feb. 7, 2023, an english translation attached herewith (10 pages).

* cited by examiner

*Primary Examiner* — Minh D A
(74) *Attorney, Agent, or Firm* — Leason Ellis LLP

(57) ABSTRACT

A stage light fixture comprises:
- a plurality of source assemblies;
- a control device configured to control each source assembly;
- a graphic module configured to generate at least one local command sequence to control the source assemblies in order to obtain at least one local graphic pattern;
- an input management module configured to receive first commands comprising external adjusting commands to control the source assemblies; second commands comprising the local commands from the graphic module; and third commands comprising external commands to (Continued)

control the source assemblies in order to obtain at least one external graphic pattern;

the input management module being configured for identifying, among the first, second and third input commands, concurrent commands for a same source assembly; selecting, among the concurrent commands, the commands to be sent to the control device on the basis of a priority level assigned to the first, second and third input commands (COMM, LOC, EXT); and sending only the selected commands to the control device.

16 Claims, 2 Drawing Sheets

STAGE LIGHT FIXTURE, STAGE LIGHT SYSTEM AND METHOD FOR OPERATING A STAGE LIGHT FIXTURE

CROSS-REFERENCE TO RELATED APPLICATIONS

This patent application claims priority from Italian patent application no. 102022000012806 filed on Jun. 16, 2022, the entire disclosure of which is incorporated herein by reference.

TECHNICAL FIELD

The present invention relates to a stage light fixture and to a stage light system comprising at least said stage light fixture.

The present invention also relates to a method for operating a stage light fixture.

BACKGROUND

Preferably, the present invention is applied to the so-called multi-source stage light fixtures, which comprise a plurality of source assemblies. Preferably, each source assembly comprises at least two light sources capable of emitting light beams with different emission spectrum. The most common source assemblies comprise four LEDs: red, green, blue and white. Each source assembly is singularly controllable.

In the stage lighting field, multi-source stage light fixtures are utilised not only as lighting apparatuses, but also for creating particular graphic effects.

The graphic effects normally comprise animations which are visible when observing the stage light fixture from the front and are usually divided into two categories:

- internal graphic effects (in technical jargon “embedded”), which consist of command sequences for some or all source assemblies of one single stage light fixture. The sequences are programmed and stored in a software inside the stage light fixture. In use, the operator normally activates them from a lighting console.
- external graphic effects (in technical jargon “pixel mapping”), which consist of command sequences for some or all source assemblies of several stage light fixtures. The sequences are programmed and stored in a software outside the stage light fixtures. Such sequences are sent to the stage light fixtures via networks of Art-Net, sACN or Kling-Net type. The external graphic effects usually involve more than one stage light fixture for obtaining overall graphic effects distributed on the stage light fixtures involved and arranged according to a certain criterion. In other words, these effects utilise the stage light fixtures as if they were, on the whole, a screen in which the pixels are defined by the single source assemblies of the stage light fixtures involved.

Currently, the technologies at disposal do not enable the technician operating at the console to simultaneously manage the external graphic effects and the basic parameters of the stage light fixture (movement, intensity, colours, zoom, etc.) and/or the internal graphic effects. The technologies at disposal, in fact, work following an “exclusive” approach. In other words, the technician at the console can work on the basic parameters and/or on the internal graphic effects or, alternatively, on the external graphic effects.

This setting significantly limits the amount of stage effects obtainable.

SUMMARY

An object of the present invention is thus to manufacture a stage light fixture which is configured to make possible the creation of innovative effects up to now not obtainable with the stage light fixtures of the prior art.

In accordance with such objects, the present invention relates to a stage light fixture comprising

- a plurality of source assemblies;
- a control device configured to control each source assembly;
- a graphic module configured to generate at least one local command sequence to control the source assemblies in order to obtain at least one local graphic pattern;
- an input management module configured to receive first commands comprising external adjusting commands to control the source assemblies; second commands comprising the local commands from the graphic module; and third commands comprising external commands to control the source assemblies in order to obtain at least one external graphic pattern;

the input management module being configured for identifying, among the first, second and third input commands, concurrent commands for a same source assembly; selecting, among the concurrent commands, the commands to be sent to the control device on the basis of a priority level assigned to the first, second and third input commands; and sending only the selected commands to the control device.

A further object of the present invention is to provide a stage light system which is capable of creating new stage effects, overcoming the above-mentioned drawbacks of the prior art in a simple and cost-effective manner, from both the functional point of view and the constructive point of view.

In accordance with such objects, the present invention relates to a stage light system as claimed in claim 7.

Finally, an object of the present invention is to provide a computer implemented method for operating a stage light fixture which is capable of obtaining innovative stage effects.

In accordance with such objects, the present invention also relates to a method for operating a stage light fixture as claimed in claim 16.

BRIEF DESCRIPTION OF THE DRAWINGS

Further characteristics and advantages of the present invention will be evident from the following description of a non-limiting example embodiment thereof, with reference to the figures of the accompanying drawings, wherein.

DESCRIPTION OF EMBODIMENTS

Figure 1:
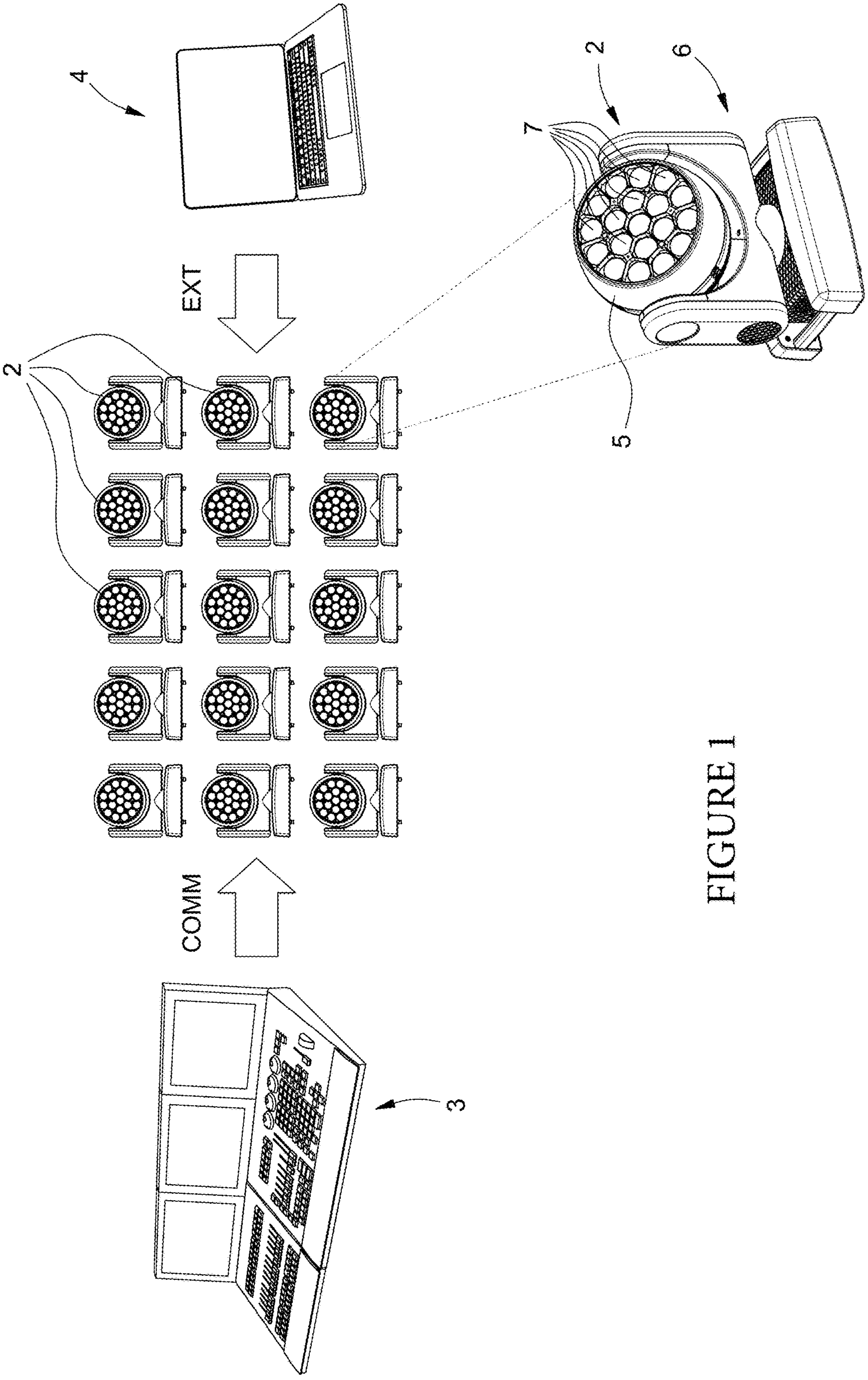
FIG. 1 is a schematic representation of a stage light system comprising at least one stage light fixture in accordance with the present invention.

In FIG. 1, reference numeral 1 indicates a stage light system in accordance with the present invention.

The system 1 comprises at least one stage light fixture 2, a control console 3 and a graphic effects generation device 4.

In the non-limiting example illustrated in FIG. 1, the system 1 comprises a plurality of stage light fixtures 2.

Preferably, the stage light fixtures 2 are positioned in order to produce a specific configuration. In the illustrated example, the configuration is a matrix. It is understood that the system 1 can comprise stage light fixtures 2 arranged according to different configurations.

As it will be specifically apparent in the following, the graphic effects generation device 4 is configured to generate an external command sequence EXT to be fed to the at least one stage light fixture 2 in order to obtain at least one external graphic pattern.

The console 3 is configured to generate adjusting commands COMM to be fed to the at least one stage light fixture 2.

Figure 2:
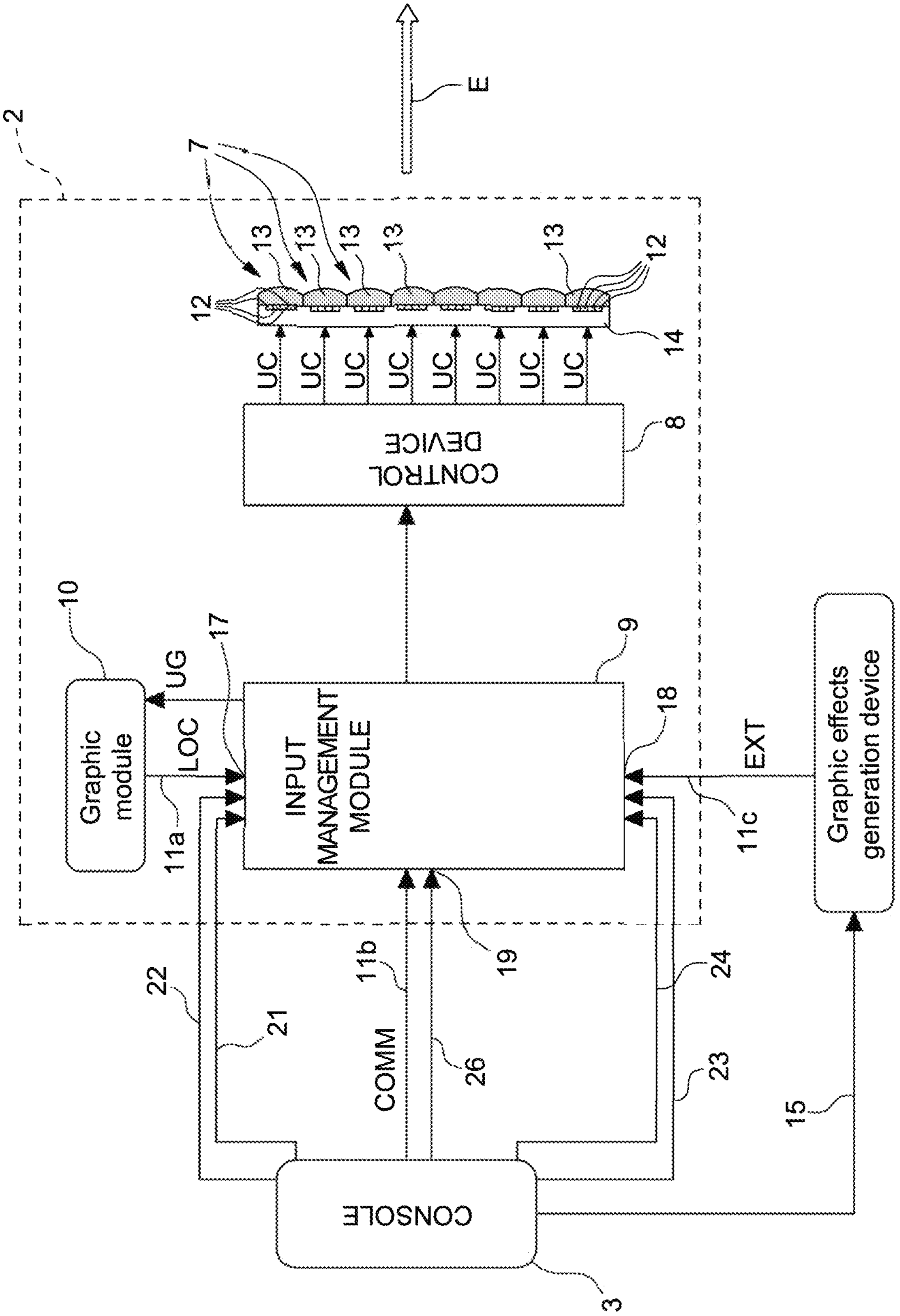
FIG. 2 is a block schematic representation of a detail of the system of FIG. 1.

Each stage light fixture 2 comprises a casing 5 (visible only in FIG. 1), supporting means 6 (visible only in FIG. 1) configured to support and handle the casing 5, a plurality of source assemblies 7, a control device 8 (visible only in FIG. 2), an input management module 9 (visible only in FIG. 2) and a graphic module 10 (visible only in FIG. 2).

In the illustrated example, the supporting means 6 are configured to enable the casing 5 to rotate around two orthogonal axes, commonly called PAN and TILT axes. As it will be specifically apparent in the following, the operation of the supporting means 6 is adjusted from the control device 8.

The plurality of source assemblies 7 is housed in the casing 5. Each source assembly 7 is individually controllable from the control device 8.

The source assemblies 7 are arranged side by side in order to define an emission surface of the stage light fixture 2.

The source assemblies 7 are substantially identical in the structure and can differ from one another for geometrical parameters which are not significant from a functional point of view.

Therefore, one single source assembly 7 will be described in the following for the sake of providing a simple description.

With reference also to FIG. 2, each source assembly 7 comprises at least two light sources 12, which emit respective light beams along an emission direction E, and at least one output optical assembly 13 arranged downstream, with respect to the direction E, of the respective light sources 12 for intercepting the emitted light beams.

The light sources 12 of a same source assembly 7 are preferably configured to emit light beams having different emission spectrum.

In the non-limiting example described and illustrated herein, the light sources 12 are defined by LEDs (LIGHT EMITTING DIODES).

Preferably, the light sources 12 are four and of the RGBW (Red Green Blue White) type and are matrix arranged.

It is understood that the number, the arrangement and the emission spectrum of the light sources 12 can be different from the one described and represented above.

For example, a variation provides for the light sources of each source assembly to be three, of the RGB type, and not matrix arranged.

The source assemblies 7 are integrated into one or more electronic cards (not illustrated for the sake of simplicity) and are supported by a support plate 14, which is coupled to a support structure (not visible in the accompanying figures) integral with the casing 4.

The source assemblies 7 are controllable in an independent manner from the control device 8. Preferably, also the single light sources 12 of each source assembly 7 are controllable in an independent manner from the control device 8.

According to a variation not illustrated, between the light sources 12 and the respective output optical assembly 13 further beam processing means can be arranged, such as for example mixers, filters, lenses, not described and illustrated herein because not related to the object of the invention.

As already mentioned, the control device 8 is configured to control each source assembly 7 and preferably each light source 12 of each source assembly 7.

Through the control of the single light sources 12 it is possible to adjust intensity and colour of each source assembly 7.

Therefore, control signals UC depart from the control device 8 for each source assembly 7. The control signals UC comprise, in the specific example illustrated herein, a flow of four commands, one for each LED 12 of the source assembly 7.

The graphic module 10 belongs to the stage light fixture 2 and is configured to generate at least one local command sequence LOC for controlling the source assemblies 7 in order to obtain at least one local graphic pattern.

The command sequence concerns at least one source assembly 7 for generating the local graphic pattern.

Local graphic pattern means graphic effects obtained via the controlled adjustment of some or all source assemblies 7. The local graphic pattern normally consists of timed and controlled power-ups of one or more source assemblies in order to obtain the effect of shapes in movement.

The generated local command sequence LOC of the graphic module 10 is not fed directly to the control device 8, but to the input management module 9 via a channel 11*a*.

Also the adjusting commands COMM and the external commands EXT are fed to the input management module 9 via respective channels 11*b* and 11*c* and not directly to the control device 8.

Preferably, the activation and the adjustment of the graphic module 10 is carried out by a technician operating at the console 3.

More preferably, the activation and the adjustment of the graphic module 10 is carried out via the adjusting commands COMM arriving from the console 3.

In other words, among the adjusting commands COMM, also graphic module adjusting commands UG will be included, which are fed to the graphic module 10 by the input management module 9.

Therefore, control elements will be present on the console 3 for adjusting the graphic module 10 (said control elements not illustrated in the accompanying figures for the sake of simplicity).

According to a variation not illustrated, the activation and the adjustment of the graphic module 10 is carried out via a dedicated communication channel which puts the console 3 directly into communication with the graphic module 10, or via a channel which puts the channel 11*b* dedicated to the exchange of the adjusting commands COMM directly into communication with the graphic module 10 without passing through the input management module 9.

In the non-limiting example described and illustrated herein, the console 3 is further configured to control the graphic effects generation device 4 via a control channel 15.

According to a variation not illustrated, the graphic effects generation device 4 is integrated into the console 3.

The input management module 9 is inside the stage light fixture 2 and is configured to receive:

- the external adjusting commands COMM for controlling the source assemblies 7;
- the local commands LOC from the graphic module 10;

the external commands EXT for controlling the source assemblies 7 in order to obtain at least one external graphic pattern.

Preferably, the input management module is provided with an input 17 configured to receive the local commands LOC from the graphic module 10, an input 18 configured to receive the external commands EXT from the graphic effects generation device 4 and an input 19 configured to receive the adjusting commands COMM from the console 3.

Preferably, the channel 11*c* which feeds the input 18 with the external commands EXT is a network channel with Art-Net or sACN or Kling-Net communication protocol.

Preferably, the channel 11*b* which feeds the input 19 with the adjusting commands COMM from the console 3 is a network channel with DMX communication protocol.

External graphic pattern means graphic effects obtained via the controlled adjustment of some or all source assemblies 7 of each stage light fixture 2. The adjustment usually comprises timed and controlled power-ups of one or more source assemblies 7 in order to obtain the effect of shapes in movement.

The external graphic pattern normally involves more than one stage light fixture 2. The stage light fixtures 2 are arranged in order to create a sort of screen, which is defined by the source assemblies 7 of each stage light fixture 2. In other words, each source assembly 7 represents a "pixel" of a "screen" composed of a plurality of stage light fixtures 2. For this reason, the external graphic patterns are often defined in the sector as "pixel mapping effects".

Therefore, the input management module 9 receives in input commands from the console 3, from the graphic effects generation device 4 and from the graphic module 10.

If the commands arriving at the input management module 9 concur for a same source assembly 7, the input management module 9 selects the commands to be sent to the control device 8 on the basis of a priority level assigned to the commands (i.e. external adjusting commands COMM, the local commands LOC and the external commands EXT).

In other words, the input management module 9 is configured for identifying, among the input commands (COMM, LOC, EXT), concurrent commands for a same source assembly 7; for selecting, among the concurrent commands, the commands to be sent to the control device 8 on the basis of a priority level assigned to the input commands (COMM, LOC, EXT); and for sending only the selected commands to the control device 8.

The above-described evaluation is carried out for all the commands which are concurrent for a same source assembly 7.

In other words, if there is not more than one command which concerns a same source assembly 7, the command is sent to the respective source assembly 7 without any intervention of the input management module 9.

Essentially, the input management module 9 acts as a filter of the commands arriving at the stage light fixture 2. It leaves the ones not concurrent for a same source assembly 7 pass and selects the commands among the ones concurrent for a same source assembly 7 on the basis of a predefined priority level.

In this manner, it is possible to integrate local commands LOC with the external commands EXT and the adjusting commands COMM without having to exclude "a priori" the contribution of the graphic module 10 and/or of the graphic effects generation device 4.

Essentially, thanks to the presence of the input management module 9, it is possible to obtain new stage effects which integrate local graphic patterns, external graphic patterns and basic adjustments.

Preferably, the priority levels are established according to the following criterion:

the local commands LOC from the first input 17, connected to the graphic module 10, have maximum priority;

the external commands EXT from the second input 18, connected to the graphic effects generation device 4, have intermediate priority;

the adjusting commands COMM from the third input 19, connected to the console 3, have minimum priority.

It is understood that the above-listed priority levels can be modified for obtaining different effects.

Preferably, the input 17 is associated with a dimmer channel 21 and a local role channel 22, whereas the input 18 is associated with a dimmer channel 23 and an external role channel 24.

The input 19 is associated with a dimmer channel 26.

According to a variation not illustrated, also the input 19 is associated with a role channel.

The dimmer channel 21, the dimmer channel 23 and the dimmer channel 26 are connected to the console 3.

The dimmer channel 21 and the dimmer channel 23 and the dimmer channel 26 are configured to send adjusting commands of the intensity of the light assemblies 7 subjected respectively to the commands LOC EXT COMM arriving at the input 17, the input 18 and the input 19, respectively.

Therefore, control elements (not illustrated) will be present on the console 3 for adjusting the intensity of the light assemblies 7 subjected to the commands LOC EXT COMM.

In other words, the operator at the console 3 can adjust the light intensity of the light assemblies 7 during the execution of the local and external graphic patterns and of the basic adjustments.

The local role channel 22 and the external role channel 24 are configured to assign a role to the commands LOC EXT arriving at the input 17 and at the input 18, respectively.

The role assignable via the local role channel 22 and the external role channel 24 can vary between master, slave and neutral.

The local role channel 22 and the external role channel 24 are also connected to the console 3.

Therefore, control elements (not illustrated) will be present on the console 3 for adjusting the role of the commands LOC EXT.

In other words, through the local role channel 22 it is possible to assign a role between master/slave/neutral to the commands LOC arriving at the input 17.

Similarly, through the external role channel 24 it is possible to assign a role between master/slave/neutral to the commands EXT arriving at the input 18.

Therefore, the input management module 9 also receives the information from the dimmer channel 21, from the dimmer channel 23, from the dimmer channel 26, from the local role channel 22 and from the external role channel 24.

On the basis of the information from the above-listed channels, the input management module 9 can change the management of the commands fed to the control device 8.

In particular, the input management module 9 is configured to reduce the priority to the commands arriving from an input if the role assigned to that input by the role channel is slave and if the intensity value adjusted by the respective dimmer channel is equal to a predefined value, preferably zero.

Preferably, the input management module 9 is configured to assign a minimum priority in the above-identified conditions (slave role and zero intensity).

This, for example, means that if a slave role is assigned to the input 17 via the local role channel 22 and zero intensity is assigned to the input 17 via the dimmer channel 21, the source assemblies 7 concerned by the local commands LOC from the input 17 will follow the concurrent commands between the external commands EXT and the adjusting commands COMM.

The input management module 9 is further configured to increase the priority to the commands arriving from an input if the role assigned to that input by the role channel is master and if the intensity value adjusted by the respective dimmer channel is equal to a predefined value, preferably zero.

Preferably, the input management module 9 is configured to assign a maximum priority in the above-identified conditions (master role and zero intensity).

This, for example, means that if a role master is assigned to the input 18 via the external role channel 24 and zero intensity is assigned to the input 18 via the dimmer channel 23, the source assemblies 7 concerned by the external commands EXT from the input 18 will have zero intensity (i.e. black pixel) despite the concurrence of local commands LOC arriving on the same source assemblies 7.

Essentially, thanks to the presence of the dimmer channel 21, of the dimmer channel 23, of the local role channel 22 and of the external role channel 24 it is possible to change the priority levels assigned in the initial step when the intensity is equal to the predefined value and the role channel is activated in slave or master mode.

If the local role channel 22 and the external role channel 24 are in neutral mode, the assigned priority level is not changed by the input management module 9, regardless of the assigned value of dimmer channels 21 23.

According to a variation not illustrated, the system 1 according to the present invention also comprises a transition channel associated with each role channel. The transition channel is configured to adjust the dimming level of the light intensity of the source assemblies 7 concerned by the respective command with graduality when the role assigned by the associated role channel is slave and the light intensity is zero.

In other words, when there is the passage to the minimum priority (i.e. slave role on role channel and zero intensity on dimmer channel) the zeroing of the lightness of the source assembly concerned by the command in slave is not sudden, but occurs in a gradual manner.

According to a further variation not illustrated, the system 1 according to the present invention comprises two further channels configured to operate in synergy and to obtain a gradual mixing in the passage from one command to another: a command selection channel and a cross-fading level selection channel.

The command selection channel is configured to select a pair of commands among the input commands at the input management module 9. Therefore, in the example described and illustrated herein, the pairs can vary among: COMM/EXT—COMM/LOC—EXT/LOC.

Through the cross-fading level selection channel, the desired mixing level is selected between the two levels. The mixing level can vary between 0%/100% up to 100%/0%.

The command selection channel and the cross-fading level selection channel are preferably connected to the console 3.

Therefore, control elements (not illustrated) will be present on the console 3 for the selection through the command selection channel and the cross-fading level selection channel.

Essentially, on the basis of the selection carried out by the operator on the console 3, the passage between the selected commands via the command selection channel on a same source assembly 7 occurs according to a given mixing level.

For example, if the selected commands are EXT/LOC and the mixing level is 20%/80%, when there is the passage from the external commands EXT to the local commands LOC on one or more source assemblies 7, there will be a mixing degree of the selected type: 20% EXT and 80% LOC.

Mixing means a mixing of colours.

It is understood that the above-described calculation architecture for processing and managing the first, second and third input commands (COMM, LOC, EXT) and present in every single stage light fixture 2 can also be implemented by a processor in a different manner, although maintaining as objective that of:

identifying, among the first, second and third input commands (COMM, LOC, EXT), concurrent commands for a same source assembly 7;

selecting, among the concurrent commands, the commands to be sent to the control device 8 on the basis of a priority level assigned to the first, second and third input commands (COMM, LOC, EXT);

sending only the selected commands to the control device 8.

Thanks to the above-described method implemented in each stage light fixture, it is possible to integrate graphic effects which up to now could not be integrated with the systems currently at disposal of the lighting designers.

Advantageously, in fact, the source assemblies 7 can simultaneously receive commands from different sources, which are managed in an automatic manner without any intervention or action by the technician and giving new degrees of freedom to the lighting designer.

The system for managing the inputs present in every single stage light fixture 2 enables a much simpler and much more creative adjustment of the pixel mapping. Different effects can be combined for creating new, more complex and more effective ones.

Besides, it is possible, thanks to the dimmer channel 23 and to the external role channel 24, to adjust the intensity and the stroboscopic effect of the external commands EXT directly from the console 2, without using controllers dedicated to the management of the graphic effects generation device 4.

Finally, thanks to the present invention, the technical operator never loses the control of the colours and of the shapes of the background and can also create intensity and role effects for all the input commands thanks to the fact that every single input is provided with dimmer channel and with a role channel.

Finally, it is evident that modifications and variations can be made to the stage light fixture, to the stage light system and to the method described herein without departing from the scope of the appended claims.

The invention claimed is:

1. Stage light fixture comprising:

a plurality of source assemblies (7);

a control device (8) configured to control each source assembly (7);

a graphic module (10) configured to generate at least one local command sequence (LOC) to control the source assemblies (7) in order to obtain at least one local graphic pattern;

an input management module (9) configured to receive:

first commands (COMM) comprising external adjusting commands to control the source assemblies (7);

second commands (LOC) comprising the local commands from the graphic module (10);

third commands (EXT) comprising external commands to control the source assemblies (7) in order to obtain at least one external graphic pattern;

the input management module (9) being configured for:

identifying, among the first, second and third input commands (COMM, LOC, EXT), concurrent commands for a same source assembly (7);

selecting, among the concurrent commands, the commands to be sent to the control device (8) on the basis of a priority level assigned to the first, second and third input commands (COMM, LOC, EXT);

sending only the selected commands to the control device (8).

2. Stage light fixture according to claim 1, wherein the input management module (9) comprises:

a first input (19) configured to receive the first commands (COMM);

a second input (17) configured to receive the second commands (LOC);

a third input (18) configured to receive the third commands (EXT).

3. Stage light fixture according to claim 1, wherein the second commands (LOC) have a maximum priority level.

4. Stage light fixture according to claim 1, wherein the first commands (COMM) have a minimum priority level.

5. Stage light fixture according to claim 1, wherein the third commands (EXT) have an intermediate priority level.

6. Stage light fixture according to claim 1, wherein each source assembly (7) comprises at least two light sources (12) configured to emit light beams having different emission spectrum (RGBW).

7. System according to claim 6, wherein the graphic effects generation device (4) is controllable from, and preferably integrated into, the control console (3).

8. Stage light system comprising:

at least one stage light fixture (2) as claimed in claim 1;

a control console (3) configured to generate adjusting commands (COMM) to control the source assemblies (7) of the at least one stage light fixture (2);

a graphic effects generation device (4) configured to generate external commands (EXT) to control the source assemblies (7) of the at least one stage light fixture (2).

9. System according to claim 8, comprising a plurality of stage light fixtures (2).

10. System according to claim 8, comprising a first, a second and a third dimmer channel (26, 21, 23) configured to adjust the intensity of the light assemblies (7) subjected respectively to the first, second and third commands (COMM, LOC, EXT); the first, the second and the third dimmer channels (26, 21, 23) being adjustable from the control console (3).

11. System according to claim 10, comprising a local role channel (22) configured to assign a role to the second commands (LOC) and/or an external role channel (24) configured to assign a role to the third commands (EXT); the role assignable via the local role channel (22) and/or the external role channel (24) being variable between master, slave and neutral.

12. System according to claim 11, wherein the local role channel (22) and/or the external role channel (24) are adjustable from the control console (3).

13. System according to claim 11, wherein the input management module (9) of the stage light fixture (2) is configured to change the priority levels assigned based on data from the first, second and third dimmer channels (26, 21, 23) and the local role channel (22) and/or the external role channel (24).

14. System according to claim 13, wherein the input management module (9) of the stage light fixture (2) is configured to reduce the priority level assigned to the second commands (LOC) and/or the third commands (EXT) if the role assigned by the respective local role channel (22) and/or the respective external role channel (24) is slave and if the intensity value adjusted by the respective second dimmer channel (23) and/or the respective third dimmer channel (26) is equal to a predefined value, preferably zero.

15. System according to claim 13, wherein the input management module (9) of the stage light fixture (2) is configured to increase the priority level assigned to the second commands (LOC) and/or the third commands (EXT) if the role assigned by the respective local role channel (22) and/or the respective external role channel (24) is master and if the intensity value adjusted by the respective second dimmer channel (21) and/or the respective third dimmer channel (23) is equal to a predefined value, preferably zero.

16. Computer implemented method for operating a stage light fixture (2) for stage lighting; the stage light fixture (2) comprising:

a plurality of source assemblies (7);

a control device (8) configured to control each source assembly (7);

a graphic module (10) configured to generate at least one local command sequence (LOC) to control at least one source assembly (7) in order to obtain at least one local graphic pattern;

an input management module (9) configured to receive:

first commands (COMM) comprising external adjusting commands to control the source assemblies (7);

second commands (LOC) comprising the local commands from the graphic module (10);

third commands (EXT) comprising external commands to control the source assemblies (7) in order to obtain at least one external graphic pattern;

the method comprising the steps of:

identifying, among the first, second and third input commands (COMM, LOC, EXT), concurrent commands for a same source assembly (7);

selecting, among the concurrent commands, the commands to be sent to the control device (8) on the basis of a priority level assigned to the first, second and third input commands (COMM, LOC, EXT);

sending only the selected commands to the control device (8).

* * * * *